United States Patent
Sockman et al.

(10) Patent No.: US 7,293,525 B2
(45) Date of Patent: Nov. 13, 2007

(54) METHOD AND APPARATUS FOR APPLYING GLAZE OR OTHER COATINGS TO FOOD PRODUCTS

(75) Inventors: Harry Gene Sockman, Winston-Salem, NC (US); William Emory Tschopp, Lewisville, NC (US); Guy Matthew Spivey, Lexington, NC (US)

(73) Assignee: HDN Development Corporation, Florence, KY (US)

( * ) Notice: Subject to any disclaimer, the term of this patent is extended or adjusted under 35 U.S.C. 154(b) by 542 days.

(21) Appl. No.: 10/651,694

(22) Filed: Aug. 29, 2003

(65) Prior Publication Data

US 2005/0048171 A1    Mar. 3, 2005

(51) Int. Cl.
*B05C 5/02* (2006.01)
*B05D 1/26* (2006.01)

(52) U.S. Cl. .............. 118/13; 118/14; 118/24; 118/DIG. 4; 99/494

(58) Field of Classification Search ............. 118/13, 118/14, 24, DIG. 4; 427/420; 426/302, 426/307; 99/516, 494
See application file for complete search history.

(56) References Cited

U.S. PATENT DOCUMENTS

| | | | |
|---|---|---|---|
| 1,109,087 A * | 9/1914 | Talbert ............... | 118/13 |
| 1,503,527 A | 8/1924 | Dumas | |
| 1,582,644 A | 4/1926 | Dumas | |
| 1,775,475 A * | 9/1930 | Savy ............... | 118/16 |
| 3,632,356 A | 1/1972 | Silverstein | |
| 4,025,775 A | 5/1977 | Beauvais et al. | |
| 4,338,911 A | 7/1982 | Smith | |
| 4,438,572 A | 3/1984 | Kaminski | |
| 4,457,291 A | 7/1984 | Henke | |
| 4,462,383 A | 7/1984 | Henke et al. | |
| 4,479,776 A | 10/1984 | Smith | |
| 4,510,601 A | 4/1985 | Delpit et al. | |
| 4,523,391 A | 6/1985 | Smith et al. | |
| 4,539,469 A | 9/1985 | Gigandet | |
| 4,591,333 A | 5/1986 | Henke | |
| 4,615,014 A | 9/1986 | Gigandet et al. | |
| 4,626,661 A | 12/1986 | Henke | |

(Continued)

FOREIGN PATENT DOCUMENTS

EP    0406090 A1    1/1991

(Continued)

OTHER PUBLICATIONS

Product information: Thermoglaze Frozen Doughnut Processing System, available at www.belshaw.com (1999).

*Primary Examiner*—Laura Edwards
(74) *Attorney, Agent, or Firm*—Kilpatrick Stockton LLP (57) ABSTRACT

The present invention relates to methods, apparatuses, and systems for coating food items, such as dough-based products, with sugar-based toppings such as glazes, icings, chocolate coatings, and the like. The present invention, in one embodiment, provides a gentle transfer of sugar-based coatings from a first container where the coatings are maintained in a fluid form suitable for coating, to a second container which comprises an applicator for coating the food product. Also described are systems for making freshly prepared food products at the point of sale comprising having the first steps of production take place at a manufacturing unit, and the final steps of production take place at the retail setting.

84 Claims, 8 Drawing Sheets

U.S. PATENT DOCUMENTS

| | | |
|---|---|---|
| 4,679,542 A | 7/1987 | Smith et al. |
| 4,781,169 A | 11/1988 | Henke et al. |
| 4,846,143 A | 7/1989 | Csadenyi |
| 4,936,248 A * | 6/1990 | Miller .......................... 118/24 |
| 5,131,841 A | 7/1992 | Smih et al. |
| 5,401,940 A | 3/1995 | Smith et al. |
| 5,463,938 A * | 11/1995 | Sarukawa et al. ............ 99/352 |
| 6,119,625 A | 9/2000 | Brummett |
| 6,511,689 B2 | 1/2003 | Lowry et al. |
| 2002/0035931 A1 | 3/2002 | Tschopp et al. |
| 2003/0079678 A1 * | 5/2003 | Zeegers et al. ............... 118/16 |

FOREIGN PATENT DOCUMENTS

| | | |
|---|---|---|
| GB | 736867 | 9/1955 |

* cited by examiner

METHOD AND APPARATUS FOR APPLYING GLAZE OR OTHER COATINGS TO FOOD PRODUCTS

FIELD OF THE INVENTION

The present invention relates generally to methods and apparatuses for the preparation of food products and, in particular, to methods and systems for coating a food product with a glaze or other coating.

BACKGROUND

Consumers enjoy a freshly prepared dough-based product. Dough-based products have a finite shelf life, and generally taste better when freshly made, than when the product is several days or even several hours old. For example, the discerning consumer may be much more likely to purchase a freshly prepared doughnut which is still warm and soft, than a doughnut which is pre-wrapped and has been sitting on the shelf for several days. Thus, retail stores selling hot doughnuts, prepared on-site, have become quite popular.

Many dough-based food products, such as doughnuts, are covered with glaze or some other type of sugar-based topping (e.g., chocolate icing). Generally, the glaze or topping is prepared by mixing together the ingredients to prepare a confection that can be poured, sprayed, or otherwise spread on a cooked product. In a standard industry practice, glazes, icings, or other types of toppings are mixed, and the mixture is pumped from a first container where it may be stored in bulk, to a smaller container from which the topping is removed to be deposited, usually as a relatively thin coating, onto the food product. Using a pump to transfer sugar-based coatings from one container to another container may be problematic in that the coating can crystallize as a result of the heat and friction that occurs as part of the pumping process. Also, it can be cumbersome to clean the pump and the other equipment used to transfer the coatings, especially if the sugar has hardened or crystallized. Finally, the pump may be damaged if the composition being pumped runs low, such that the pump is pumping air rather than the liquid coating.

Although freshly prepared food products are extremely popular, it may not be physically or economically feasible to set up a full-scale production process at a particular retail site. The ability to prepare doughnuts in a retail store location may require a significant capital investment and substantial operating costs. For example, to prepare doughnuts from scratch requires equipment to mix the dough and to extrude the dough into a pre-set shape, as well as equipment to cook the dough and to add any optional fillings or glazes to the doughnut. Also, preparing food products, such as doughnuts, from scratch may require storage of raw ingredients, as well as significant space requirements to set up the production line. In some cases, the capital investment, operating costs, and space required to prepare food products from scratch may not justify opening a production unit in a retail location. For example, although the market for fresh doughnuts in an airport or a mall may be strong, space constraints might make it difficult to justify opening a full-scale production unit in such a setting.

Thus, it would be desirable to have an improved methodology for applying sugar-based coatings on food products. It would also be desirable to provide freshly prepared dough-based products at retail sites that may not have full-production capabilities. For example, it would be desirable to prepare a dough-based product having the taste of a doughnut made from scratch, but only requiring that the last few manufacturing steps actually be performed on-site. It would also be desirable to have the preparation of the food product be visible to the consumer in a way that is interesting and entertaining, thereby increasing interest in, and demand for, the product.

SUMMARY

The present invention comprises products and processes for applying coatings, such as sugar-based glazes and other types of confectionary coatings, to food products. The apparatuses, methods, and systems of the present invention may be used in a manufacturing setting, at the point of sale, or other locations. For example, using one method of the present invention, dough-based products that are prepared in bulk at a manufacturing site may be shipped to a retail store, and the final steps of product preparation performed at the retail store.

In one embodiment, the present invention provides a unit for applying glazes or other types of confectionary coatings to a food product. One embodiment of the present invention utilize a rotating wheel to transfer coatings from a first container for storing the coating to a second container for applying the coating to the food product. The wheel-based method of transfer of the present invention is gentle, and involves little friction and/or heating of the coating. Thus, there is reduced crystallization and/or hardening of most sugar-based coatings, such as glazes, icings and the like. Also, the coating operation of the present invention can be interesting and fun to watch and thus, there is an element of entertainment to the process that may result in increasing customer interest and ultimately, demand for the product.

There are several advantages associated with the present invention. Current systems for spreading confectionary toppings on food products generally require that the coating be pumped from a storage container to a container attached to the apparatus used for coating. For example, in some cases, the apparatus used for coating sprays the coating onto the food product. Other applicators may pour the coating onto the food product. Pumping a sugar-based coating, however, involves forcing the coating through a closed system of tubes and valves. Thus, pumping is often associated with the generation of friction and heat, both of which can cause sugar-based coatings to crystallize. Thus, one advantage is the elimination of using a pump to transfer sugar-based compositions. By not using a pump, there is reduced friction and therefore, reduced crystallization of the coatings, resulting in a higher quality product.

Also, the method of transferring glaze or coatings described by the present invention allows for greater consistency in the temperature of the coating. Thus, because of the gentle nature of the transfer mechanism, heat does not build up as a result of the coating being forced through a narrow tube or pump valve. The reduction in crystallization and the ability to maintain the coating at a more consistent temperature may be associated with a longer lifetime for most sugar-based coatings, thereby resulting in less waste.

Yet another advantage of the present invention is the ability to run multiple glazes/icings simultaneously.

Also, as described above, the method of coating of the present invention can be interesting and fun to watch. Thus, the methods and apparatus of the present invention may provide an entertaining visual presentation that in increases customer interest and ultimately, demand for the product.

Also, by warming a pre-cooked dough-based product and immediately coating the warmed product with a sugar-based topping, a dough-based product having the taste and consistency of a product made from scratch may be obtained. Thus, another advantage of the present invention is that it allows for the sale of freshly prepared dough-based products in a setting that may not be able to support a full-scale manufacturing unit, but which would be expected to provide a high demand for the product.

There are additional features of the invention which will be described hereinafter and which will form the subject matter of the claims appended hereto. It is to be understood that the invention is not limited in its application to the specific details as set forth in the following description and figures. The invention is capable of other embodiments and of being practiced or carried out in various ways.

DETAILED DESCRIPTION

The present invention provides apparatuses, methods and systems for applying glaze or other types of coatings to a food product. In one embodiment, the present invention comprises an apparatus for applying a coating to a food product. In an embodiment, the apparatus may comprise two containers. In one embodiment, the apparatus provides a means to store an amount of coating that is to be deposited on a food product in a first container. In a further embodiment, the coating is stored in the first container in a fluid form. Also, the coating may be transiently stored in the first container until the coating operation is complete. Also, in an embodiment, the apparatus comprises a second container which functions at least in part to hold the coating prior to application of the coating to a food product. Thus, in an embodiment, the second container is positioned for holding a portion of the coating prior to deposition of the coating on the food product. The apparatus may also comprise a wheel to transfer coating from the first container to the second container. In one embodiment, the wheel may comprise at least two coaxial disks. The disks may be positioned relative to each other in a manner to facilitate transfer of the coating. For example, in an embodiment, the disks are spaced apart from each other to form an inner (or intra-disk) space. In the embodiment where there is a space between the disks, the two outer faces of each disk may comprise at least a portion of the outer surface of the wheel. Also, in an embodiment, the wheel is positioned to facilitate transfer of the coating. Thus, in an embodiment, at least a portion of the wheel is positioned in the first container for removing the coating from the first container. Also, in an embodiment, the wheel is positioned to facilitate transfer of the coating to the second container. Thus, in one embodiment, at least a portion of the wheel is positioned proximate at least part of the second container. Thus, in an embodiment, upon rotation of the wheel, the wheel transfers coating from the first container to the second container.

In another embodiment, the present invention also comprises a process to transfer a coating from a first container to a second container. The process may comprise the step of at least partially filling a first container with a coating to be applied to a food product. In an embodiment, a wheel is used to transfer the coating from the first container to a second container. For example, the wheel may be positioned so that that at least a portion of the wheel is positioned in the first container from which the coating is stored. In an embodiment, the wheel is positioned to facilitate delivery of the coating to the second container. Thus, in an embodiment, at least a portion of the wheel is positioned proximate to at least part of the second container for delivery of the coating to the second container. The disks may be positioned relative to each other in a manner to facilitate transfer of the coating. For example, in an embodiment, the disks are spaced apart from each other to form an inner space. In the embodiment where there is a space between the disks, the two outer faces of each disk may comprise at least a portion of the outer surface of the wheel. In an embodiment, the wheel may be rotated such that at least a portion of the coating from the first container is transferred to the second container.

In an embodiment, the process may further comprise a method of applying a coating to at least one food product. For example, in an embodiment, once the coating has been transferred from the first container to a second container, coating may be removed or allowed to exit the second container to cover at least a portion of the surface of at least one food product.

Thus, the present invention recognizes that the natural viscosity and surface tension of most sugar-based toppings, such as glazes and icings, may be utilized to facilitate the transfer of such coatings from one container to another. In an embodiment, coating from the first container is capable of least partially covering the outer surface of both disks and at least partially filling the inner space between the two disks as the wheel is rotated. For example, in an embodiment, the first container is positioned below the second container such that as the wheel is rotated, coating is lifted from the first container to the second container.

Once the coating is transferred to the wheel from the first container it may be deposited in the second container. In an embodiment, the second container comprises a means to remove coating from the wheel and to deliver the coating to the second container. For example, the second container may comprise at least one protrusion adapted to remove coating from the wheel and to deliver the coating to the second container. In a further embodiment, the second container comprises a first protrusion extending at least partially into the inner space between the two disks. The second container may also comprise a second protrusion adjacent to the outer face of the first disk and a third protrusion adjacent to the outer face of the second disk.

In another embodiment, the second container at least partially surrounds the perimeter of each disk of the wheel. For example, the second container may comprise slots for insertion of each disk, such that as the disks rotate through the second container, coating is removed from the outer surfaces of both disks and the inner space between the disks, and is deposited in the second container.

The size and location of the protrusions in the second container may be selected based on the type of coating being transferred and its relevant characteristics such as, but not limited to, thickness, surface tension, viscosity, sugar content, and the like. For example, the protrusions may comprise at least part of the base of the second container that extends between the disks. For example, in an embodiment, slots about 4 inches long and about 5/16 inches wide are cut in the base of the second container for insertion of the disks of the wheel. In this embodiment, the protrusions of the second container are about 4 inches long and about 5/16 inches wide. The protrusions may be positioned from about 1/4 to about 1/2 inches away from the inner and outer surfaces of each disk.

In an embodiment, the second container comprises a trough. Also, in an embodiment, the second container comprises an opening adapted to allow a portion of the coating to flow from the second container. In a further embodiment, the opening in the second container further comprises a ledge extending from the opening. The ledge may allow for a more controlled flow of the coating from the second container. In a further embodiment, the ledge further comprises at least one vertical face. The vertical face may be used to further control flow of the coating from the second container. Thus, in an embodiment, the opening is adapted to allow a portion of the coating to flow from the second container as a thin curtain of coating.

The coating apparatuses and methods of the present invention may be automated to provide a steady flow of food products to be coated. For example, in an embodiment, there may be a conveyor to transport at least one food product beneath the second container. As the food product moves under the second container, some of the coating that is being poured onto the food product may spill over onto the conveyor. Thus, in a further embodiment, the conveyor comprises a plurality of rubber rings. Thus, in an embodiment, the coating does not stick easily to the o-rings and drains into the lower container. Also, coating that does stick to the o-rings is rubbed off of the o-rings as they wrap around the rods which motor the conveyor.

A variety of food products may be coated using the apparatuses and methods of the present invention. For example, in an embodiment, the food product comprise baked goods, such as cakes, muffins, bagels, English muffins and various types of bread. In an embodiment, the food product comprises a dough-based product. In a further embodiment, the food product comprises doughnuts. As described herein, doughnuts include, but are not limited to, ring doughnuts, doughnut shells, doughnut holes, cake doughnuts, doughnut twists, and cinnamon rolls.

In an embodiment, the coating comprises a sugar-based coating. For example, the coating may comprise a glaze or other sugar-based coating used in the food industry. As described herein, coatings include, but are not limited to, glazes, icings, chocolate compound coatings, cream toppings, yogurt toppings, and the like. For example, there are many types of glazes that can be used with the apparatuses and methods of the present invention including, but not limited to, simple glaze (comprising water, stabilizer and 6×sugar), flavored glazes, glazes comprising particulates, complex glaze (comprising water, granulated sugar, 6×sugar, stabilizer, and glaze flavoring), and ready-to-use glaze (commercially available from various sources).

The present invention may be used to transfer glaze and other sugar-based coatings from a first container where the glaze is stored as a relatively large volume, to a second container where the coating is stored as a smaller volume to allow for controlled application of the coating to a food product. Generally, the container used for application of the coating to a food material is at a height to allow the coating operation to be monitored and observed. Thus, in an embodiment, the smaller container for application of the coating is at about waist to shoulder level.

In selecting suitable materials for constructing the disks used to make the wheels, a number of factors may be considered. The material used for the disks should be stable to the temperatures used for keeping the coatings in fluid form. For example, to keep a sugar-based glaze in fluid for requires temperatures on the order of 110-140° F. The material used for the disks should also be a material that is chemically stable and/or inert, and that can be thoroughly cleaned between uses. Thus, the material used for the disks should not degrade or wear upon repeated use. Also, the material used for the disks should comprise a material that the coatings will adhere to. For example, the coatings may be expected to adhere to plastic better than to other surfaces, such as metal. Thus, in an embodiment, the disks are made of plastic. For example, plastics standard in the food industry, such as, but not limited to, polypropylene or polyethylene may be used.

In general, the disks may be sized to allow transfer of a volume of coating required to coat a pre-determined number of doughnuts. For example, in an embodiment, the apparatuses and methods of the present invention may be used to coat over 100 dozen doughnuts per hour. In a further embodiment, the apparatus of the present invention may be used to coat over 250 dozen doughnuts per hour. In yet another embodiment, more than 600 dozen doughnuts per hour may be coated using the present invention.

The size and number of the disks may be selected base on a number of factors. These factors can include the volume of coating being transferred, the physical characteristics of the coating, the size of the first and second containers, and the like. For example, in an embodiment, a 5 gallon batch of glaze is mixed and poured into a lower container. The disks may be sized to fit in the lower container and to transfer at least enough glaze to the upper container so that a preset number of doughnuts are glazed per hour. In an embodiment, the disks may be up to 4 feet in diameter. In an embodiment, the disks may range in diameter from about 1 foot to 4 feet. In a further embodiment, the disks may range in diameter from about 18 to 24 inches in diameter. In yet a further embodiment, the disks comprise polyethylene disks that are about 12 inches in diameter and 1/4 inches thick.

The wheels may comprise at least two disks so as to maximize transfer of the coating from the first (lower) container to the second (upper) container. By using two disks or more, the coating fills the volume between the disks and transfer of the coating solution can be enhanced. In an embodiment, more than two disks per wheel are used. Thus, three disks or more may be used per wheel. The numbers of disks used may be varied based on demand for the food product being produced. Thus, as inventories are sold, an operator may choose to add a disk, to thereby increase production capacity.

Also, in an embodiment, the inner space (i.e., the space between the disks) is sized such that coatings that adhere to the outer surface of the disk will fill the inner space. For example, in an embodiment, the two disks are spaced apart by about ¼ to about 2 inches. In another embodiment, the two disks are spaced apart by about ¼ to about 1 inch. In one embodiment, the two disks are ⅜ of an inch apart.

The inner space between the disks may also be varied by reducing the diameter of the area available to be filled with the coating. For example, it is possible that in some cases, the coating being transferred might become trapped between the disks (i.e., in the inner or intra-disk space) rather than being released in the second container. If the coating is trapped for extended periods of time, it can harden and become unusable.

In an embodiment, the wheel comprises an internal spacer that is positioned between the two disks so as to reduce the inner space between the two disks. For example, in an embodiment, the disks are connected by a internal section having a smaller diameter and positioned to be flush with each of the two larger disks. In this way, the coating being transferred does not become trapped in the innermost volume between the disks. Also, in an embodiment, the disks are connected in a manner so that they rotate as a single unit.

As described above, the food product may be transiently positioned under the second container as the coating is deposited onto the food product. For example, in an embodiment, a food product is moved underneath the container by a conveyer system as coating is poured on the item. In an embodiment, additional conveyor systems are used to transfer the food product from the coating apparatus to downstream processing units, such as packaging stations and the like.

Also, in an embodiment, at least some of the coating that does not stick to the food product drains back into the coating apparatus. For example, in an embodiment, the second container is adapted to transfer coating to at least one food product in excess, and the first container is positioned to receive the excess coating from the second container. The first container, in some embodiments, may be positioned generally below the second container to receive excess coating from the second container.

Although the coating apparatus of the present invention may be used during the majority of a workday shift in retail operations, there may be times when there is a need to stop coating food products, as for example, when there is a need to change coatings, or there is an inventory of product to be sold, or when the store is closed. Thus, in an embodiment, the first container comprises an aperture that drains the first container. In this way the container may be washed and prepared for the next coating operation.

The first (lower) container is preferably used to store the coating prior to transfer of the coating to a smaller container for application of the coating to the food product. In an embodiment, means is provided to keep the coating in the first container at a temperature that is warmer than room temperature. For example, the apparatus may comprise a water jacket that surrounds at least a portion of the first container.

In an embodiment, the water jacket is adapted to maintain the temperature of a coating positioned in the first container. Other types of units for warming, such as heating coils, lamps and the like may also be used. Where a water jacket is used to heat the first container, the apparatus may comprise an aperture that drains the water jacket.

There may also be a means to heat the upper container so as to maintain the coating in liquid form. Still, as the coating is only transiently stored in the upper container, there may not be a need for heating the upper container.

In an embodiment, the coating apparatus may comprise additional wheels, each having at least two coaxial disks. For example, there may be two wheels, each on the same axel positioned at opposite ends of the first container. In this way, the amount of coating deposited in the upper container may be doubled. Alternatively, there may be three or more wheels, each comprising dual disk and positioned on the same axel.

In an embodiment where there are two coaxial wheels, with each wheel comprising dual disks, the coating is deposited on opposite ends of the second (upper) container. In this way, the coating deposited in the upper container can flow from each end of the container towards the opening in the middle of the container. This allows for a controlled and even flow of the coating from the upper container as it is poured, or otherwise deposited, on the food products.

Thus, in an embodiment, the apparatus further comprises a second wheel, the second wheel comprising at least two coaxial disks, wherein the two disks of the second wheel are spaced apart from each other to form an inner space, and wherein the two outer faces of each disk comprise at least a portion of the outer surface of the second wheel.

In the embodiment where there are two wheels, the first container may comprise a divider positioned to divide the first container into a first sub-container and a second sub-container, wherein at least a portion of the first wheel is positioned in the first sub-container and wherein at least a portion of the second wheel is positioned in the second sub-container. In a further embodiment, the first container divider may comprise a closable port adapted to allow mixing of the contents of each sub-container.

Also in the embodiment where there are two wheels, the second container may comprise a panel to divide the second container into a first sub-trough and a second sub-trough, wherein at least a portion of the first wheel is positioned proximate at least part of the first sub-trough and wherein at least a portion of the second wheel is positioned proximate at least part of the second sub-trough. In a further embodiment, the second container comprises a slot into which the panel is inserted.

The present invention also comprises a product or system for preparing a dough-based product. In an embodiment, the system comprises having the initial production occur at a manufacturing site, and having the final steps of production occur at a retail site. In this way, a product having the taste and texture of a dough-based product that has been made completely from scratch may be attained at the retail site.

Thus, in an embodiment, the present invention comprises a system for the preparation of food products comprising a heating unit for warming a pre-cooked food product. In an embodiment, the system also comprises an apparatus for applying a coating to the warmed food product. For example, in one embodiment, the apparatus comprises at least one wheel for transferring the coating from a first container to a second container positioned for holding at least a portion of the coating prior to deposition of the coating on the food product.

Also, in an embodiment, the wheel comprises at least two coaxial disks, wherein at least a portion of the wheel is positioned in the first container and at least a portion of the wheel is positioned proximate at least a part of the second container, wherein upon rotation of the wheel, the wheel transfers coating from the first container to the second container. For example, in an embodiment, the first container is positioned below the second container such that the wheel lifts the coating from the first container to the second container.

In an embodiment, the two disks are spaced apart from each other to form an inner space, and the two outer faces of each disk comprise at least a portion of the outer surface of the wheel. Thus, in a further embodiment, coating from the first container is capable of at least partially coating the outer surfaces of both disks and at least partially filling the inner space between the two disks as the wheel is rotated.

Once the coating is transferred to the wheel from the first container it may be deposited in the second container. In an embodiment, the second container comprises at least one protrusion adapted to remove a coating from the wheel and to deliver the coating to the second container. For example, in an embodiment, the second container comprises a first protrusion extending at least partially into the inner space between the two disks. Also, the second container may comprise a second protrusion adjacent to the outer face of the first disk and a third protrusion adjacent to the outer face of the second disk. In yet another embodiment, the second container at least partially surrounds the perimeter of each disk of the wheel. For example, the second container may comprise slots for insertion of each disk, such that as the disk rotates through the second container, coating is removed from the outer surface of both disks and deposited in the second container.

Also, in an embodiment, the apparatus further comprises a second wheel, the second wheel comprising at least two coaxial disks, wherein the two disks of the second wheel are spaced apart from each other to form an inner space, and wherein the two outer faces of each disk comprise at least a portion of the outer surface of the second wheel.

In an embodiment, the second container comprises a trough. Also, in an embodiment, the second container comprises an opening adapted to allow a portion of the coating to flow from the second container. In a further embodiment, the opening the opening in the second container further comprises a ledge extending from the opening. The ledge may allow for a more controlled flow of the coating from the second container. In a further embodiment, the ledge further comprises at least one vertical face. The vertical face may be used to further control flow of the coating from the second container. Thus, in an embodiment, the opening is adapted to allow a portion of the coating to flow from the second container as a thin curtain of coating.

The system may be automated to provide a steady flow of food products to be coated. For example, in an embodiment, the apparatus may comprise a conveyor to transport at least one food product beneath the second container. As the food product moves under the second container, some of the coating that is being poured onto the food product may spill over onto the conveyor. Thus, in a further embodiment, the system may comprise a plurality of rubber rings adapted to rub any excess coating off of the conveyor.

A variety of food products may be coated using the systems of the present invention. For example, in an embodiment, the food product comprise baked goods, such as cakes, muffins, bagels, English muffins and various types of bread. In an embodiment, the food product comprises a dough-based product. In a further embodiment, the food product comprises doughnuts. As described herein, doughnuts include, but are not limited to, ring doughnuts, doughnut shells, doughnut holes, cake doughnuts, doughnut twists, and cinnamon rolls.

In an embodiment, the coating comprises a sugar-based coating. For example, the coating may comprise a glaze or other sugar-based coating used in the food industry. As described herein, coatings include, but are not limited to, glazes, icings, cream toppings, yogurt-based toppings, and the like.

The methods, apparatuses, and systems of the present invention provide a unique way to transfer coatings from one container to another. In an embodiment, the transfer of the coating from the first container to the second container provides a visual display which may be viewed by an observer. In a further embodiment, the visual display comprises a promotional feature which may be displayed in a retail setting. Thus, the present invention recognizes that the visual presentation of the wheels being coating with a topping and the topping being delivered to food products as a thin curtain comprises a visual display that is of interest to at least some observers. For example, an apparatus of the invention may be configured to deliver more than one coating (e.g., chocolate and vanilla toppings) to a food product and may be displayed in a store front window, thereby increasing interest in the food product being made.

Figure 1:
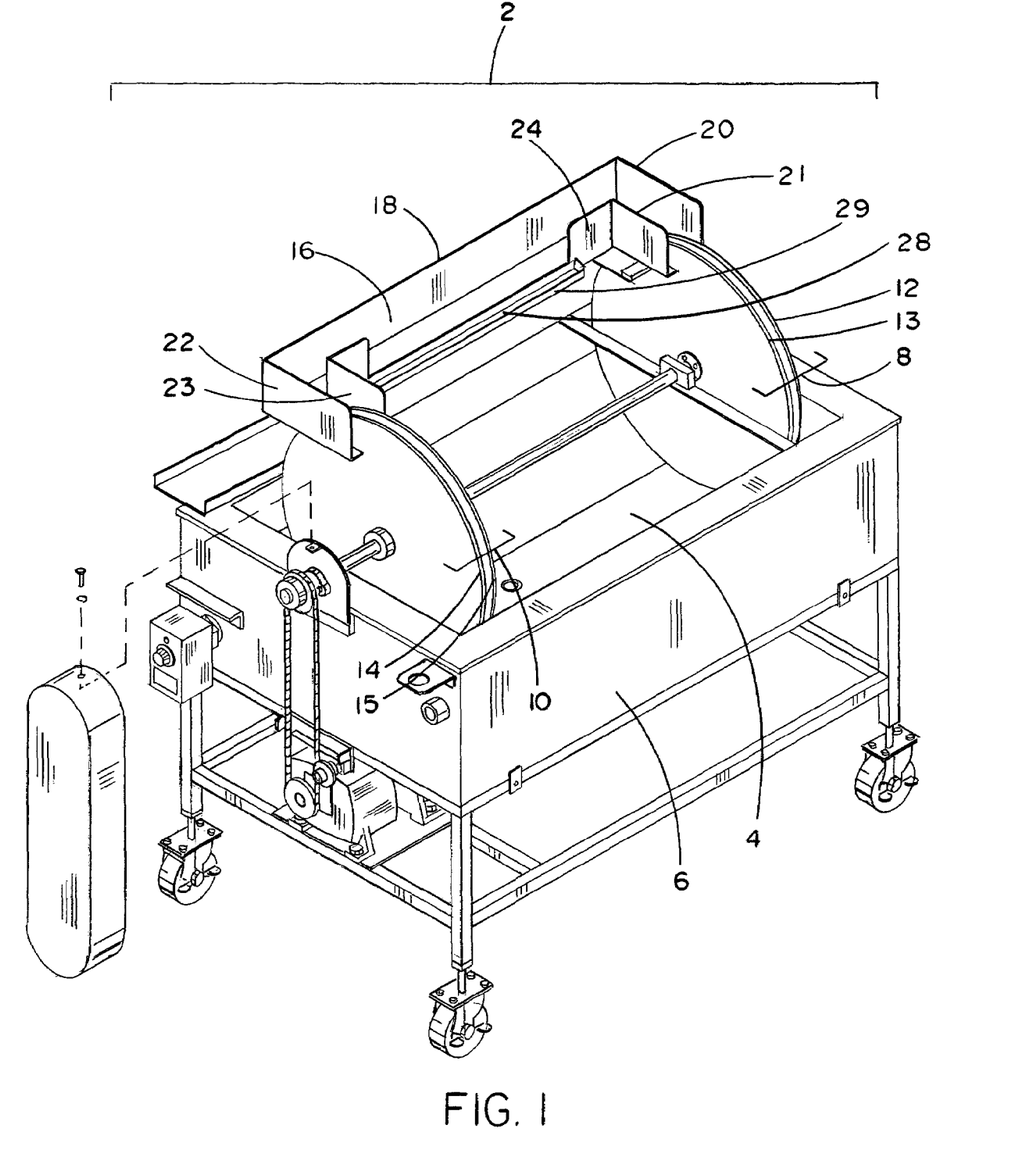
FIG. 1 shows a perspective top view of part of an apparatus for coating food products in accordance with an embodiment of the present invention.

FIGS. 1-8 illustrate embodiments of an apparatus 2 of the present invention for coating food products. FIG. 1 is a perspective top view showing a first (lower) container 4 surrounded by a water jacket 6. In an embodiment, the first container is fitted in the shape of a V-shaped trough. For example, lower container 4 and water jacket 6 may be made of stainless steel, plastic, or other materials resistant to corrosion. The trough of the first container is generally sized to store an appropriate amount of coating depending upon the production needs required. For example, troughs may be sized to comprise volumes ranging from 20 to 300 pounds of coating. In a further embodiment, troughs may be sized to comprise volumes ranging from 40 to 200 pounds of coating. In a further embodiment, the trough may be sized to comprise a volume of 50 or 120 pounds of coating. Such troughs may be custom made (as in the embodiment shown), or may be purchased from commercial suppliers.

FIG. 1 also shows wheels 8 and 10, each comprising two polyethylene disks 12, 13, and 14, 15, respectively, positioned such that the bottom of each disk rests inside the first container 4 and at least a part of the upper portion of each disk is positioned proximate at least a portion of the second (upper) container 16. The disks may be made using a material to which the coating will adhere and that can be cleaned between coating operations. For example, in an embodiment, polyethylene disks ¼ inches thick and 12 inches in diameter are used. For example, in the embodiment shown, wheel 8 is positioned such that the bottom of the wheel (and each disk) is inserted into the first container 4 which may be at least partially filed with glaze or some other type of coating.

It can also be seen (FIG. 1) that the second container 16 is U-shaped, comprising a long back wall 18, and short side walls 20, 21, and 22, 23. In an embodiment, the upper container has an opening in the front wall 24. In an embodiment, the opening in second container 16 comprises a small ledge 28, having at least one vertical face 29, to help control the flow of the coating out of the container 16. In an embodiment, a conveyor (not shown in this figure) is positioned below the second container 16. For example, in the embodiment shown, where the upper container has walls about 3 inches high, the ledge comprises a horizontal shelf that extends from the base of the first (upper) container by about 1 inch and which has a vertical outside wall of about ½ inch. Similar to the first (lower) container, the upper container may be made of stainless steel, plastic, or other materials resistant to corrosion. Such troughs may be custom made (as in the embodiment shown), or may be purchased from commercial vendors.

Figure 2:
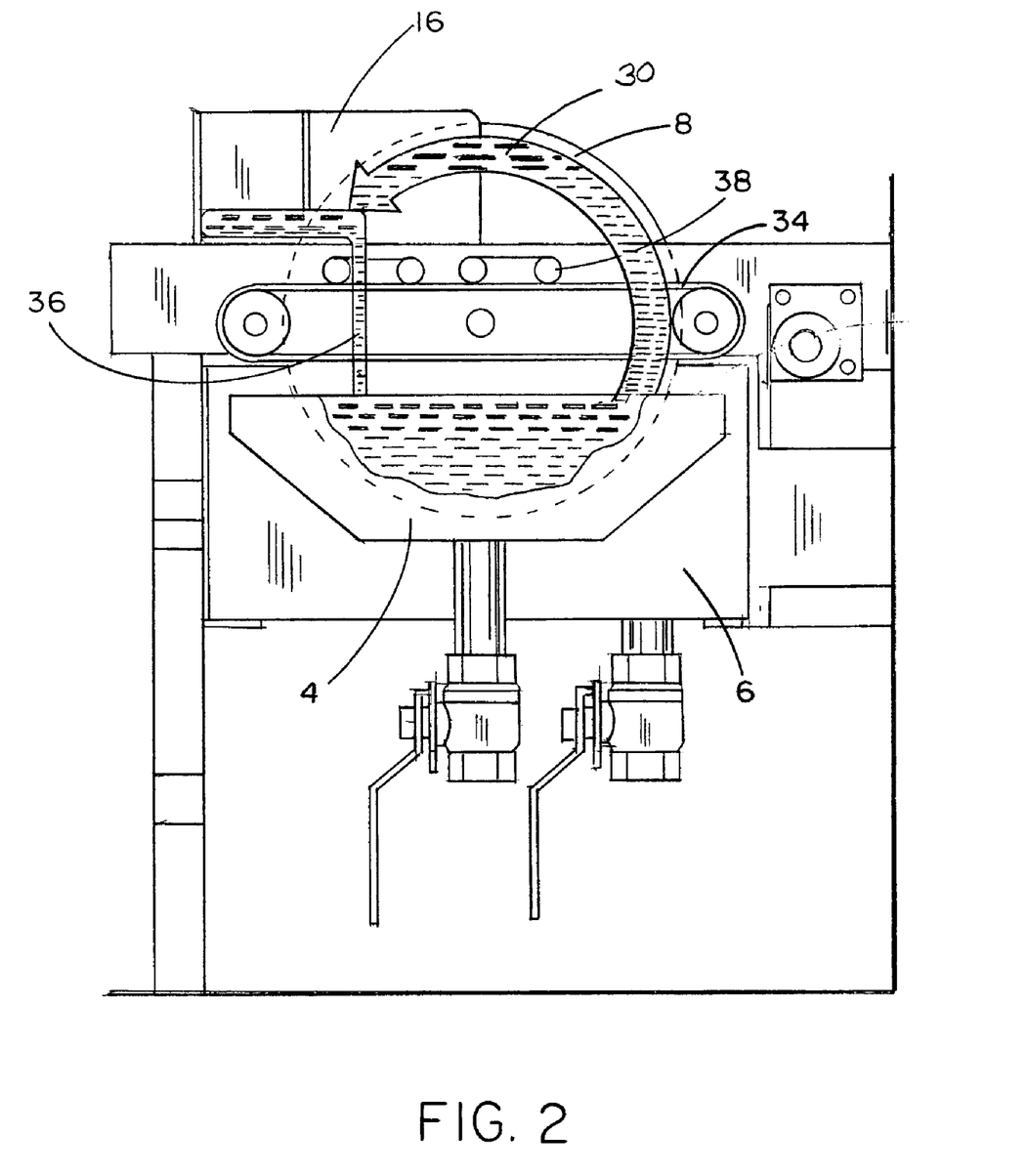
FIG. 2 shows a schematic depicting using a wheel to transfer a liquid coating in accordance with an embodiment of the present invention.

A schematic illustrating how the coating is transferred from the first container 4 to the second container 16 in an embodiment of the present invention is shown in FIG. 2. Thus, in an embodiment, glaze 30 present in the first (lower) container 4 fills a space between the two coaxial disks that make up each wheel. As the wheel rotates (counter-clockwise in the embodiment shown), glaze in the space between the two wheels is transported from the first (lower) container 4, to the second (upper) container 16. The glaze distributes throughout the second container 16 to reach a certain pre-determined height. As described above, in an embodiment, the ledge 28 and vertical support wall 29, which borders the opening in the front wall 24 of the upper container 16, controls outflow of the glaze 30 from the upper container 16 (FIG. 1). As the glaze in the second container exceeds a particular height, it will spill over the ledge, creating a fine curtain of glaze 36 that pours out of the upper container 16. Some of the curtain will be deposited on the doughnuts (or other dough-based products) 38 moving underneath the upper container 16. The remainder of the glaze flows through the conveyer belt 34 and back into the first container 4 (FIG. 2). The glaze that spills back to the first (lower) container is recirculated. Thus, the glaze that spills back to the first container 4 can be transferred back up to the second container 16 such that a portion of the recirculated glaze will coat the food products and a portion of the glaze will again spill over.

The ability to recirculate the coatings multiple times underscores an advantage of the present invention. The process of coating generally requires using an excess of coating for each item. Thus, applying a pre-determined amount of coating to a particular food product usually results in some of the coating dripping off of the food product, and some of the coating being applied to items other than the food item (such as the conveyor transporting the food product). Thus, it may be important to be able to re-use the excess coating that does not adhere to the food product of interest. However, as discussed herein, when sugar based coatings are exposed to repeated conditions of high temperature and friction, as is typical of systems that use pumps to recycle sugar-based confections from a storage container to an applicator for coating, the coating may crystallize. Using the wheel-based transfer mechanism of the present invention does not lead to high temperatures or friction. Thus, the coatings may be recycled for multiple coating operations without any loss due to crystallization or high temperature degradation.

Figure 3:
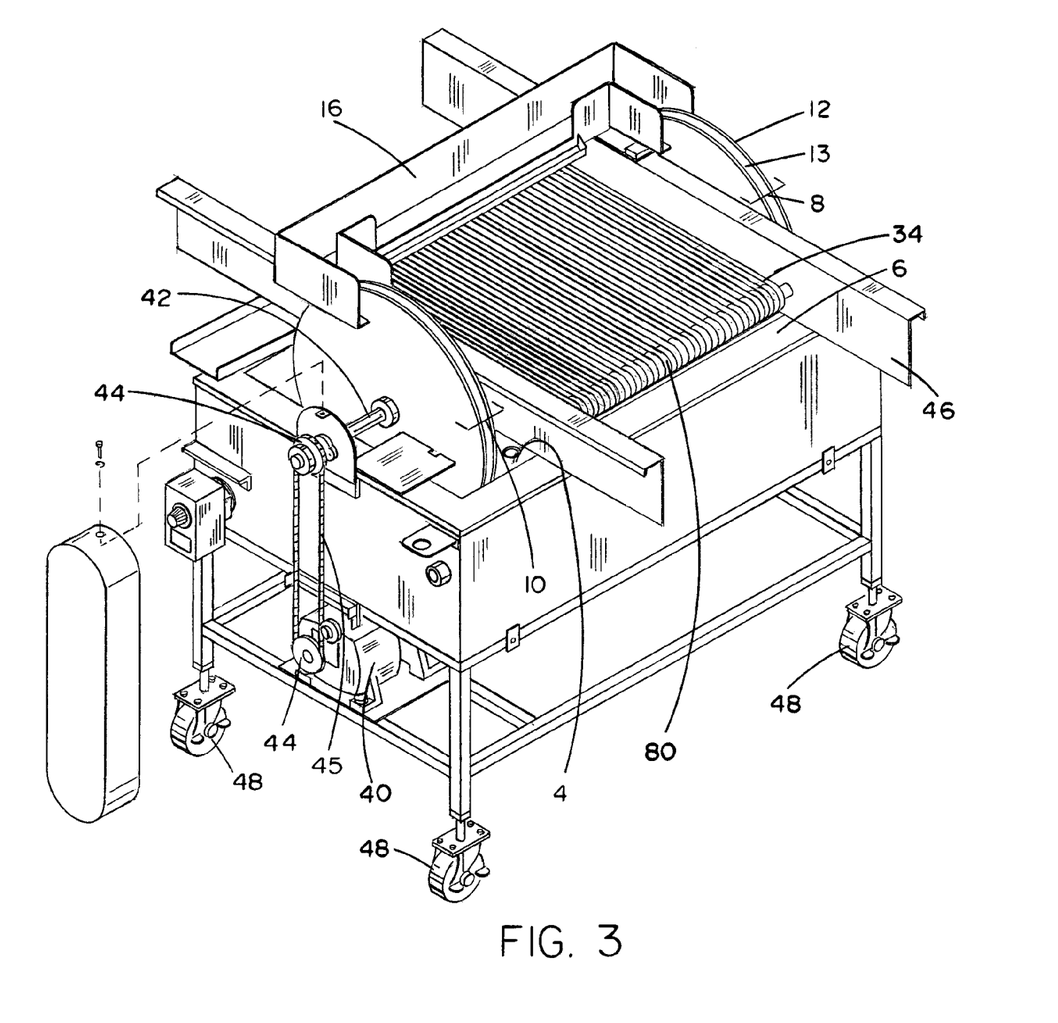
FIG. 3 shows a perspective and partially exploded top view of an apparatus for coating food products in accordance with an embodiment of the present invention.

FIG. 3 shows a top perspective view of the apparatus of the present invention. Shown are the first container 4 with a surrounding enclosed void volume 6 that may be filled with water to function as a water jacket to heat coating present within the first container 4. A first motor 40 may be used to turn an axel 42 connecting both wheels 8, 10. For example, in an embodiment, the motor comprises a 30 rpm gear head motor. In an embodiment, the axel comprise a stainless steel rod, ⅞ inches in diameter and 24 inches long. For wider conveyers that comprise the capability to transport more donuts, the lower container, upper container and axel may all be lengthened. For example, in an embodiment, the axel (and upper and lower containers) may be almost 4 feet in length. The axel may also be custom-made or purchased commercially.

To connect the axel to the disks of each wheel, and to secure the wheels so that they do not turn independently of the axel, key and screw set fittings, standard in the art may be employed. As shown in FIG. 3, the gear mechanism 44 for turning the wheels 44 may be covered to protect the mechanism from becoming contaminated during the coating process. Gear mechanisms and drive chains 45 used to enable the motor to power the wheels may be custom-made or may be purchased from suppliers standard in the art.

In an embodiment, one motor is used to power the wheel and conveyor system(s). Alternatively, the coating apparatus of the present invention may comprise more than one motor to turn the wheels and conveyor belt systems. In an embodiment, a first motor 40 is used to turn the axel 42 connecting both wheels 8, 10, and a second motor (not shown) may be used to power the conveyor systems.

Also, lateral supports 46 may be used to support the second (upper) container 16. For example, in the embodiment shown, the lateral beams comprise 11 gauge steel flats bent into an L-shape 8 inches by 3 inches.

In an embodiment, the apparatus of the present invention is a mobile unit and comprises a rolling mechanism such as wheels 48 to allow the apparatus to be inserted into the production line for a particular dough-based product. For example, any number of commercially available wheels suitable for supporting food manufacturing equipment may be used. Also shown in FIG. 3 is a conveyor 34 for moving food products under the second container. Such conveyor belts are known in the art and may be custom-made or purchased from commercial vendors.

Figure 4:
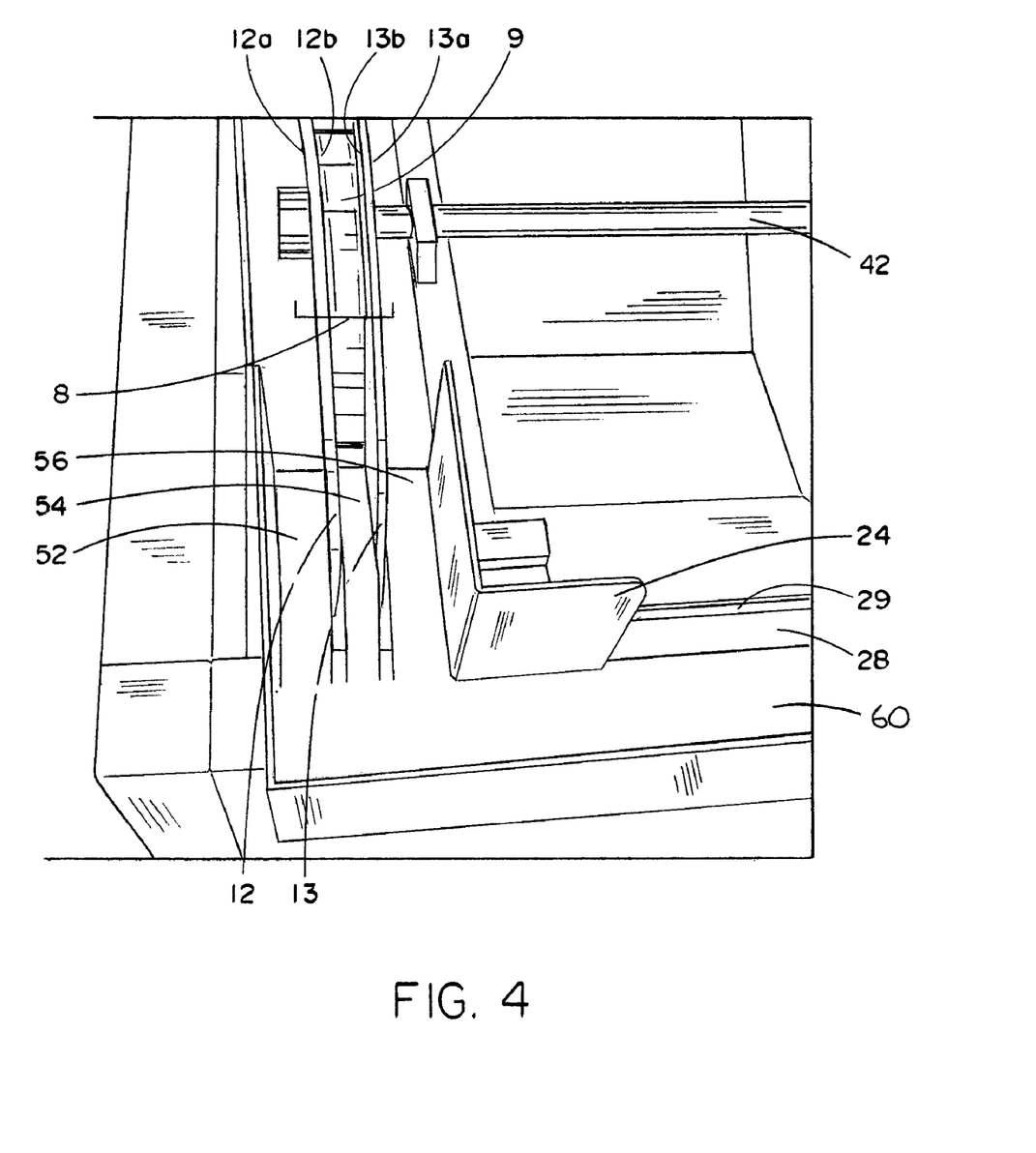
FIG. 4 shows a perspective top view of a second container comprising protrusions positioned proximate a dual-disk wheel in accordance with an embodiment of the present invention.

FIG. 4 shows a top perspective view of the dual disks of one wheel. Thus, in an embodiment, a wheel 8 comprises at least two disks 12, 13, which are connected to each other via the axel 42 that connects one wheel 8 to the other wheel (not shown).

As shown in FIG. 4, the second (upper) container comprises full side walls and a full back wall, but only a partial front wall 24 comprising an opening. Protrusions 52, 54, and 56 are positioned to remove the coating off of each disk as the wheel is rotated. Thus, it can be seen that one protrusion 52 is positioned to remove coating that adheres to the outside face 12a of the outer disk 12, a second protrusion 54 is positioned within the space between the disks, and thus is positioned to scrape coating that adheres to the inside face (12b, 13b) of both disks (12, 13), and the third protrusion 56 is positioned to scrape coating from the outside surface 13a of inner disk 13. In an embodiment, the protrusions comprise part of the base 60 of the upper container which have been cut out to allow insertion of the disks for each wheel.

As seen in FIG. 4, each wheel may comprises an inner portion 9, comprising a smaller disk positioned between each of the outer disks 12, 13. Thus, in an embodiment, the intra-disk space does not extend completely to the axel 42, but has an inner diameter greater than the axel. In this way, coating which fills the volume between the disks does not get trapped in the intra-disk space adjacent to the axel, but may be scraped clean from the intra-disk space by the central protrusion 54.

Figure 5:
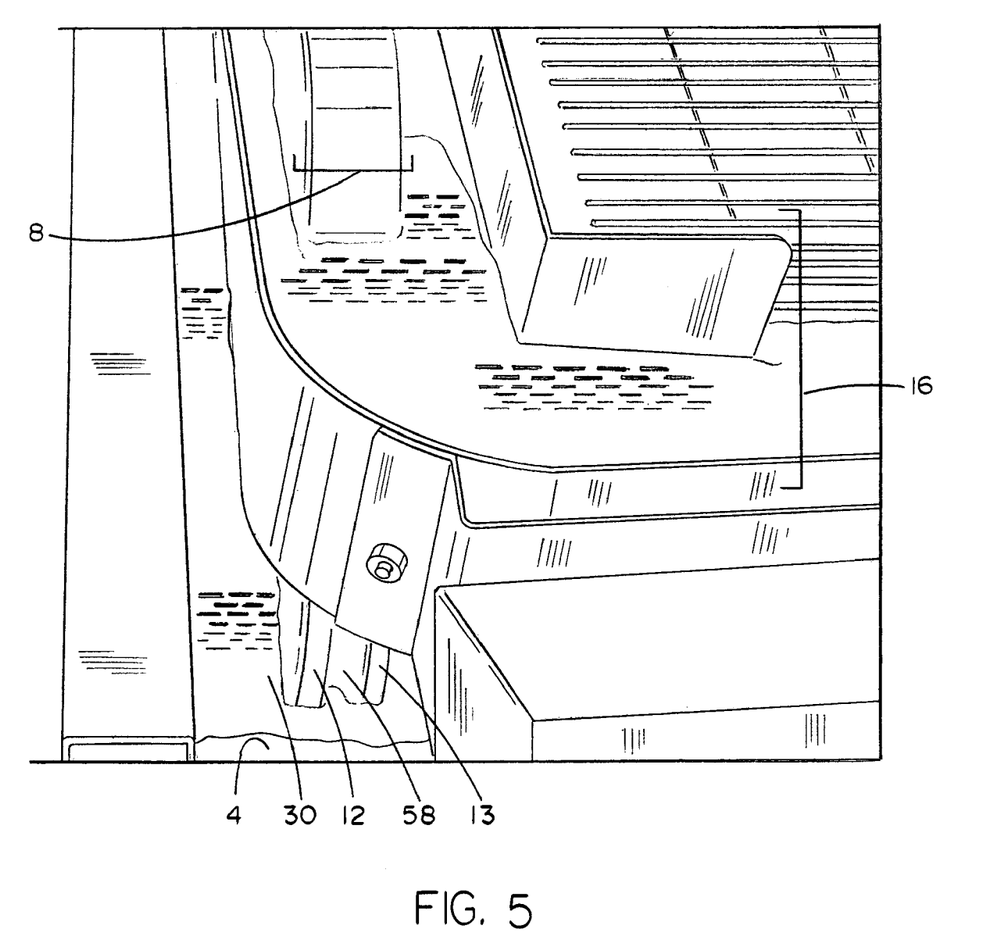
FIG. 5 shows glaze being transferred from a lower container to an upper container in accordance with an embodiment of the present invention.

FIG. 5 shows wheel 8 having two disks 12, 13 turning through glaze 30 in the first (lower) container 4 and delivering the glaze to the second upper container 16. It can be seen that in an embodiment, the space between the two disks 58 is almost entirely filled with the glaze. As the wheel turns (from back to front for the view shown) protrusions 52, 54, and 56 (not visible) at the base of the second container will remove at least a portion of the glaze from each disk surface such that the glaze will be retained in the upper trough 16. Also shown in FIG. 5 is the opening by which the glaze leaves the upper trough 16 to be poured onto the doughnuts. Thus, it can be seen that the glaze 30 is distributed throughout the trough of the upper container 16 and then may exit the upper container 16 via the opening.

Figure 6:
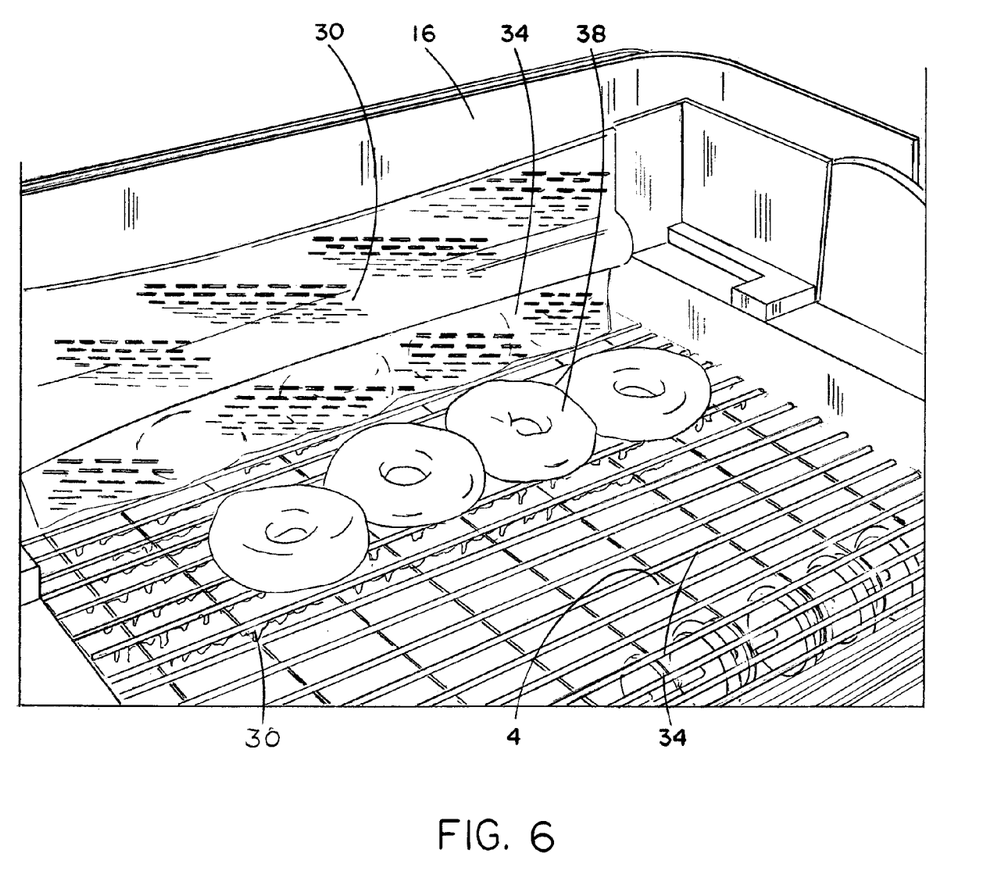
FIG. 6 shows a front perspective view of the glaze being poured onto doughnuts that are moved by a conveyer belt in accordance with an embodiment of the present invention.

FIG. 6 shows a front perspective view of glaze in the second, upper container 16 being poured onto doughnuts 38 that are being moved (from back to front for the view shown) by a conveyor belt 34 under a curtain of glaze 36. It can be seen that, in the embodiment shown, the doughnuts 38 are covered with the glaze 30 as they move under the liquid curtain 36. Also in the embodiment shown, most of the excess glaze 30 will flow through the conveyor belt 34 and return to the first container 4 below.

It may be seen that in some embodiments, the conveyer 34 used to transport the doughnuts under the glazing system may become at least partially coated with the glaze or other topping 70 (FIG. 6). Thus, in an embodiment, the conveyor comprises rubber o-rings. In this way, as the o-rings turn around roller 80, excess glaze is squeezed off of the o-ring and falls back into the first container. For example, in an embodiment, rubber o-rings positioned adjacent to the conveyor system may be used to rub glaze from the conveyor 34.

Figure 7:
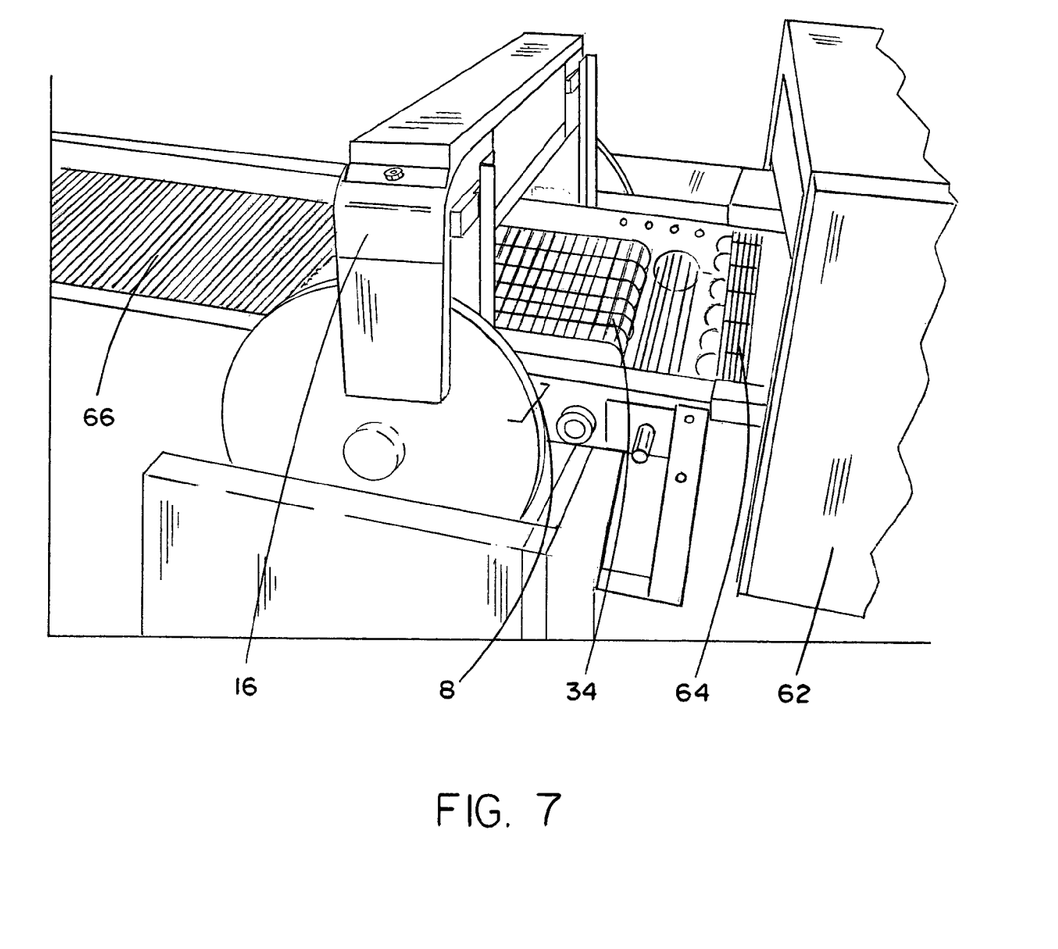
FIG. 7 shows an embodiment of the present invention having the upper container rotated ninety degrees (counter clock-wise in the view shown) such that the glaze may be drained from the upper container.

There may be times when the coating activity needs to be temporarily suspended. Thus, in an embodiment, the second (upper) container may be drained to allow any excess coating to be recycled to the first container where it is kept warm and thus, will not harden by the time the next batch of products are ready for coating. As shown in FIG. 7, the second container may be lifted up, rotated 90 degrees, and rested on the conveyor support to allow the coating to drain from the second (upper) container to the first lower container. By rotating the second container (counter-clockwise in the view shown), glaze is able to drain from the second (upper) container back into the first (lower) container.

In an embodiment of the present invention, the food products are warmed using a heating unit prior to being coated. For example, heating units for warming doughnuts may be custom-made, or are commercially available. Examples of commercially available heating units for use in embodiments of the present invention included impingement ovens available from Lincoln Oven Company Fort Wayne, Ind. (Model No. 1132-000-A). In embodiments of systems of the present invention utilizing heater units, the heating conditions may be selected using methods and techniques known to those of skill in the art. Examples of such parameters include type of heating unit, heating time, heating temperature, flow rate of air for certain ovens, line speed of conveyor, etc. Factors that are important in determining the values for such parameters include the type of food product being heated, the temperature of the food product (e.g., whether the food product is frozen, warm, room temperature, etc.), the desired temperature of the food product for application of the coating, the number and size of the food products being heated, etc Thus, in an embodiment, a heater 62 is positioned upstream of the coating/glazing apparatus of the present invention (FIG. 7). Also, a conveyor 64 may be positioned for feeding the warmed food products from the heater to the coating apparatus.

Thus, in some situations, the coating apparatus of the present invention is used to coat food products that have been pre-cooked and frozen or refrigerated. In an embodiment, the pre-cooked dough-based products are loaded onto a conveying mechanism which feeds the dough-based products into the heater. In one embodiment, an operator manually loads the dough-based products. Alternatively, the dough-based products may be transported through a heating apparatus by the conveying mechanism. After heating, the dough-based products may be transferred via a conveying mechanism 64 to the glazing/coating apparatus. After coating, the dough-based products may be transported for additional processing. For example, the glazed dough-based products may be filled, or topped with sprinkles, nuts and the like. Also, the glazed dough-based products may be weighed (for quantitative assessment of the amount of glaze added per doughnut) and/or packaged for sale.

Alternatively, the coating apparatus of the present invention may be part of a larger production unit. Thus, in an embodiment, a production unit comprising a dough mixer and extruder is used to shape uncooked dough into a doughnut. The doughnuts are fried and proofed using methods and systems known in the art. At this point, the doughnuts may be fed (i.e., by hand or using a conveying mechanism) into the coating apparatus of the present invention. After coating, the dough-based products may be transported for additional processing such as being filled with jelly, or topped with sprinkles, nuts and the like.

Thus, in an embodiment, and again referring to FIG. 7, the conveyor 34 that is used to transport food products under the curtain of coating (e.g., glaze) may be connected to another conveyor 66 downstream of the coating conveyer 34. The downstream conveyor may have multiple purposes. For example, in an embodiment, the downstream conveyor allows the coating to solidify and/or harden such that the product is ready for packaging and/or sale. Also, the downstream conveyor provides and efficient means for transfer of the coated product to the next production step (e.g., filling with cream/jelly; covering with further condiments).

Figure 8:
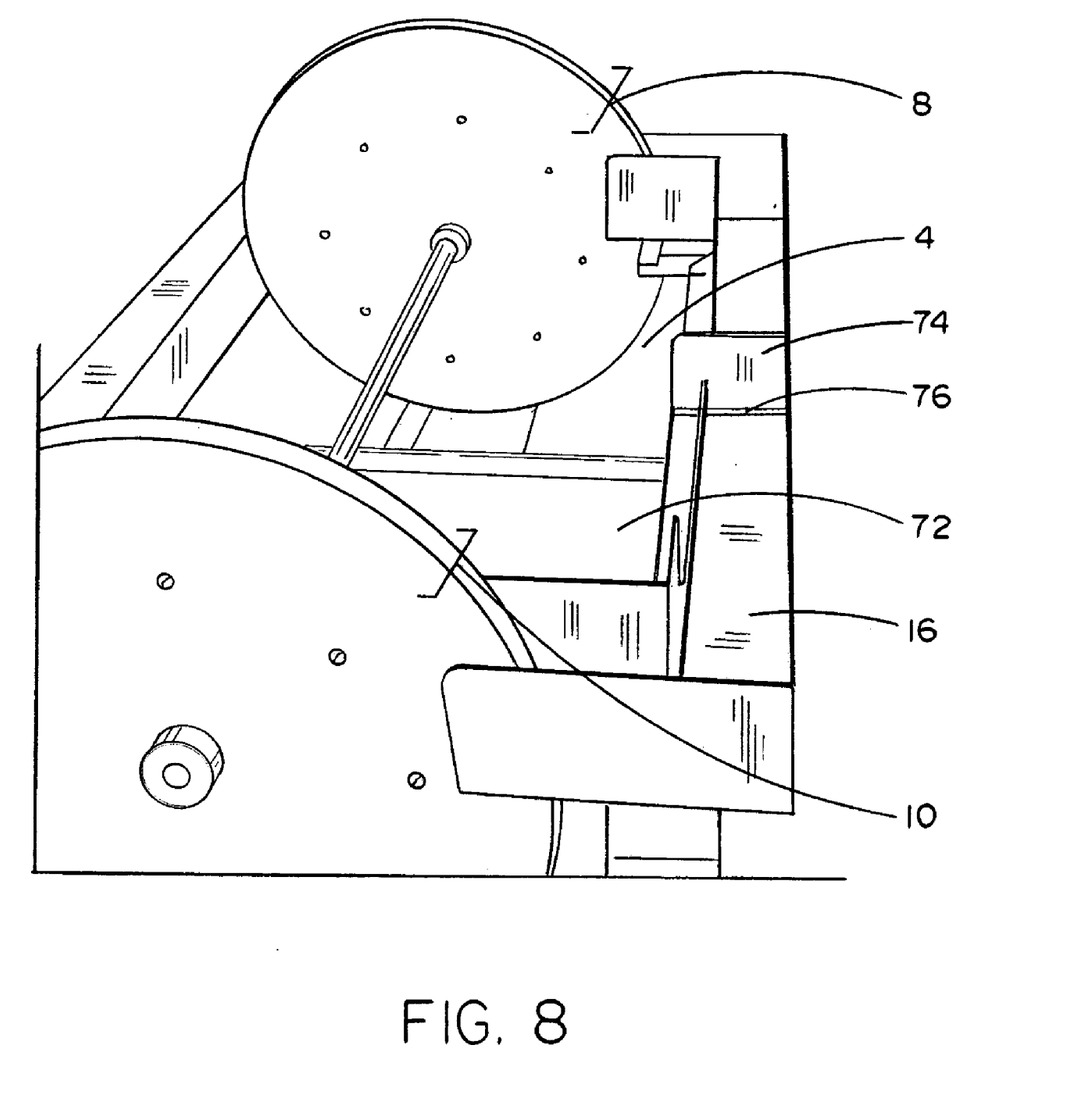
FIG. 8 shows a glazing unit comprising divided upper and lower containers for applying two different coatings to a food product in accordance with an embodiment of the present invention.

FIG. 8 shows an embodiment comprising a two-wheel coating system in which the first (lower) container 4 and the second (upper) container 16 are each divided in half by central panels 72 and 74, respectively. In this embodiment, one side of the coating system may be filled with one type of coating (e.g., chocolate glaze) and the other side of the coating system may be filled with another type of coating (e.g., clear glaze). In an embodiment, there is an aperture at the bottom of central panel 72 which allows for the contents of each half of the first container to be mixed. Also in an embodiment, the divider for the second upper container comprises a slot 76, such that the divider panel may be reversibly inserted and removed.

The present invention also comprises a system for producing freshly-prepared dough-based products. For example, any number of stores may receive precooked dough-based products from a distribution center. The precooked dough-based products may be transported from the distribution center to the stores in any number of ways. In one embodiment, after cooking, the dough-based products are placed in trays having a cavity or depression for each dough-based product, the trays are placed in racks, the racks are loaded on a truck and the dough-based products are transported to the stores. Alternatively, flat-bottomed carriers may be used.

The distribution center may be a store. For example, a company may own a store that is open during the day for retail sales. During the time that the store is closed to retail sales or during non-peak hours, the store may continue making dough-based products. Thus, by utilizing the systems of the present invention, a dough-based product company can open numerous stores in smaller markets that may be unable to support a full-size store.

As noted above, the dough-based products that leave the distribution center are cooked. In an embodiment, when the dough-based products are doughnuts, the doughnuts are mixed, extruded, proofed and fried at the distribution center. Any finishing (e.g., glazing, icing, filling, and/or topping) of the dough-based products may occur at the stores after the dough-based products are heated. In one embodiment, the doughnuts are mixed, extruded, proofed and fried under normal process conditions (e.g., as if the doughnuts are going to be sold on-site). In other embodiments, the process conditions may be modified such that the doughnuts produced at the distribution have a modified oil content to result in a final product at the store with more desirable properties.

When the precooked dough-based products reach the stores, they may be refrigerated, kept at room temperature, or immediately reheated as demand requires. For example, in an embodiment, pre-cooked doughnuts may be refrigerated for at least up to 36 hours prior to glazing, more preferably at least 48 hours, even more preferably, at least 72 hours, and even more preferably, at least 96 hours.

In another embodiment, the glazing system of the present invention is used at a center which is at least partly devoted to manufacture. Thus, although the methods and apparatus of the present invention are suitable for display, the advantages provided by the wheel-based system for transporting fluids make use of the apparatus and methods of the present invention suitable for a manufacturing operation as well as a retail setting. For example, using the two-wheel system and split upper and lower containers, over 600 dozen doughnuts per hour, having two different types of topping can be made and packaged for shipping to retail centers.

Various embodiments of the invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

That which is claimed:

1. An apparatus for applying a coating to a food product comprising:
    a first container for storing the coating;
    a second container for holding at least a portion of the coating prior to deposition of the coating on the food product and comprising at least one protrusion; and
    at least one wheel comprising at least two coaxial disks, wherein the two disks are spaced apart to form an inner space, and wherein the two outer faces of each disk comprise at least a portion of the outer surface of the wheel, and wherein at least a portion of the wheel is positioned in the first container and at least a portion of the wheel is positioned proximate at least a portion of the second container such that upon rotation of the wheel, the wheel transfers coating from the first container to the second container,
wherein the protrusion is adapted to remove coating from the wheel and to deliver the coating to the second container.

2. The apparatus of claim 1, wherein coating from the first container is capable of at least partially covering the outer surface of both disks and at least partially filling the inner space between the two disks as the wheel is rotated.

3. The apparatus of claim 1, wherein the first container is positioned below the second container such that as the wheel is rotated, coating is lifted from the first container to the second container.

4. The apparatus of claim 1, wherein the second container comprises means to remove coating from the wheel and to deliver the coating to the second container.

5. The apparatus of claim 1 wherein the at least one protrusion comprises a first protrusion extending at least partially into the inner space between the two disks.

6. The apparatus of claim 5, wherein the second container comprises a second protrusion adjacent to the outer face of the first disk and a third protrusion adjacent to the outer face of the second disk.

7. The apparatus of claim 1, wherein the second container comprises slots for each disk, such that as the disks rotate through the second container, coating is removed from the outer surface of both disks and the inner space between the disks and is deposited in the second container.

8. The apparatus of claim 1, wherein the second container comprises a trough.

9. The apparatus of claim 1, wherein the second container comprises an opening adapted to allow at least a portion of the coating to exit from the second container.

10. The apparatus of claim 9, wherein the opening in the second container further comprises a ledge extending from the opening.

11. The apparatus of claim 10, wherein the ledge further comprises at least one vertical face.

12. The apparatus of claim 9, wherein the opening is adapted to allow a portion of the coating to flow from the second container as a thin curtain of coating.

13. The apparatus of claim 1, further comprising a conveyor to transport at least one food product beneath the second container.

14. The apparatus of claim 13, wherein the conveyor comprises a plurality of rubber rings.

15. The apparatus of claim 1, wherein the food product comprises a dough-based product.

16. The apparatus of claim 1, wherein the food product comprises doughnuts.

17. The apparatus of claim 1, wherein the coating comprises a sugar-based coating.

18. The apparatus of claim 1, wherein the coating comprises a glaze mixture.

19. The apparatus of claim 1, wherein the disks comprise plastic.

20. The apparatus of claim 1, wherein the disks are up to about 4 feet in diameter.

21. The apparatus of claim 1, wherein the disks are from about one foot to about two feet in diameter.

22. The apparatus of claim 1, wherein the wheel comprises at least one additional disk positioned between the first and second disks.

23. The apparatus of claim 1, wherein the wheel comprises a spacer that is positioned between the two disks so as to reduce the inner space between the two disks.

24. The apparatus of claim 1, wherein the second container is adapted to transfer coating to at least one food product in excess and wherein the first container is positioned to receive the excess coating from the second container.

25. The apparatus of claim 1, further comprising an aperture adapted to drain coating from the first container.

26. The apparatus of claim 1, further comprising a water jacket that surrounds at least a portion of the first container.

27. The apparatus of claim 26, wherein the water jacket is adapted to maintain the temperature of a coating positioned in the first container.

28. The apparatus of claim 1, wherein the at least one wheel comprises a first wheel and further comprising a second wheel, the second wheel comprising at least two coaxial disks, wherein the two disks of the second wheel are spaced apart to form an inner space, and wherein the two outer faces of each disk comprise at least a portion of the outer surface of the second wheel.

29. The apparatus of claim 28, wherein the first container comprises a divider positioned to divide the first container into a first sub-container and a second sub-container, wherein at least a portion of the first wheel is positioned in the first sub-container and wherein at least a portion of the second wheel is positioned in the second sub-container.

30. The apparatus of claim 29, wherein the divider comprises a closable port adapted allow mixing of the contents of each sub-container.

31. The apparatus of claim 28, wherein the second container comprises a panel to divide the second container into a first sub-trough and a second sub-trough, wherein at least a portion of the first wheel is positioned proximate at least part of the first sub-trough and wherein at least a portion of the second wheel is positioned proximate at least part of the second sub-trough.

32. The apparatus of claim 31, wherein the second container comprises a slot into which the panel is inserted.

33. The apparatus of claim 1, wherein the transfer of the coating from the first container to the second container provides a visual display which may be viewed by an observer.

34. The apparatus of claim 33, wherein the visual display comprises a feature which may be displayed in a retail setting.

35. An apparatus for the preparation of food products comprising:
a heating unit for warming a pre-cooked food product; and
the apparatus of claim 1.

36. The apparatus of claim 35, wherein the first container is positioned below the second container such that the wheel lifts the coating from the first container to the second container.

37. The apparatus of claim 35, wherein coating from the first container is capable of at least partially coating the outer surfaces of both disks and at least partially filling the inner space between the two disks as the wheel is rotated.

38. The apparatus of claim 35, wherein the at least one protrusion comprises a first protrusion extending at least partially into the inner space between the two disks.

39. The apparatus of claim 38, wherein the second container comprises a second protrusion adjacent to the outer face of the first disk and a third protrusion adjacent to the outer face of the second disk.

40. The apparatus of claim 35, wherein the second container comprises slots for insertion of each disk, such that as the disk rotates through the second container, coating is removed from the outer surface of both disks and deposited in the second container.

41. The apparatus of claim 35, further comprising a second wheel, the second wheel comprising at least two coaxial disks, wherein the two disks of the second wheel are spaced apart to form an inner space, and wherein the two outer faces of each disk comprise at least a portion of the outer surface of the second wheel.

42. The apparatus of claim 35, wherein the second container comprises a trough.

43. The apparatus of claim 35, wherein the second container comprises an opening adapted to allow a portion of the coating to flow from the second container.

44. The apparatus of claim 43, wherein the opening is adapted to allow a portion of the coating to flow from the second container as a thin curtain of coating.

45. The apparatus of claim 35, further comprising a conveyor to transport at least one food product beneath the second container.

46. The apparatus of claim 35, wherein the food product comprises a dough-based product.

47. The apparatus of claim 35, wherein the food product comprises doughnuts.

48. The apparatus of claim 35, wherein the coating comprises a sugar-based coating.

49. The apparatus of claim 35, wherein the coating comprises a glaze mixture.

50. The apparatus of claim 35, wherein the transfer of the coating from the first container to the second container provides a visual display which may be viewed by an observer.

51. The apparatus of claim 50, wherein the visual display comprises a feature which may be displayed in a retail setting.

52. An apparatus for applying a coating to a food product comprising:
a first container for storing the coating;
a second container for holding at least a portion of the coating prior to deposition of the coating on the food product and comprising at least two slots; and
at least one wheel comprising at least two coaxial disks, wherein the two disks are spaced apart to form an inner space, and wherein the two outer faces of each disk comprise at least a portion of the outer surface of the wheel, and wherein at least a portion of the wheel is positioned in the first container and at least a portion of the wheel is positioned proximate at least a portion of the second container such that upon rotation of the wheel, a first coaxial disk rotates through a first slot in the second container, a second coaxial disk rotates through a second slot in the second container, and coating from the first container is removed from the outer surfaces of both disks and the inner space between the disks and is deposited in the second container.

53. The apparatus of claim 52, further comprising a conveyor to transport at least one food product beneath the second container.

54. The apparatus of claim 52, wherein the food product comprises a dough-based product.

55. The apparatus of claim 52, further comprising a water jacket that surrounds at least a portion of the first container.

56. The apparatus of claim 55, wherein the water jacket is adapted to maintain the temperature of a coating positioned in the first container.

57. The apparatus of claim 52, further comprising a second wheel, the second wheel comprising at least two coaxial disks, wherein the two disks of the second wheel are spaced apart to form an inner space, and wherein the two outer faces of each disk comprise at least a portion of the outer surface of the second wheel.

58. The apparatus of claim 52, wherein the second container comprises an opening adapted to allow at least a portion of the coating to exit from the second container.

59. The apparatus of claim 52, wherein the coating comprises a sugar-based coating.

60. The apparatus of claim 52, wherein the wheel comprises a spacer that is positioned between the two disks.

61. The apparatus of claim 52, wherein the second container is adapted to transfer coating to at least one food product in excess and wherein the first container is positioned to receive the excess coating from the second container.

62. An apparatus for the preparation of food products comprising:
- a heating unit for warming a pre-cooked food product; and
- the apparatus of claim 52.

63. An apparatus for applying a coating to a food product comprising:
- a first container for storing the coating;
- a water jacket surrounding at least a portion of the first container;
- a second container for holding at least a portion of the coating prior to deposition of the coating on the food product; and
- at least one wheel comprising at least two coaxial disks, wherein the two disks are spaced apart to form an inner space, and wherein the two outer faces of each disk comprise at least a portion of the outer surface of the wheel, and wherein at least a portion of the wheel is positioned in the first container and at least a portion of the wheel is positioned proximate at least a portion of the second container such that upon rotation of the wheel, the wheel transfers coating from the first container to the second container.

64. The apparatus of claim 63, wherein the water jacket is adapted to maintain the temperature of a coating positioned in the first container.

65. The apparatus of claim 63, further comprising a conveyor to transport at least one food product beneath the second container.

66. The apparatus of claim 63, wherein the food product comprises a dough-based product.

67. The apparatus of claim 63, wherein the second container comprises an opening adapted to allow at least a portion of the coating to exit from the second container.

68. The apparatus of claim 63, wherein the coating comprises a sugar-based coating.

69. The apparatus of claim 63, wherein the wheel comprises a spacer that is positioned between the two disks.

70. The apparatus of claim 63, wherein the second container is adapted to transfer coating to at least one food product in excess and wherein the first container is positioned to receive the excess coating from the second container.

71. An apparatus for the preparation of food products comprising:
- a heating unit for warming a pre-cooked food product; and
- the apparatus of claim 63.

72. An apparatus for applying a coating to a food product comprising:
- a first container for storing the coating;
- a second container for holding at least a portion of the coating prior to deposition of the coating on the food product;
- a first wheel comprising at least two coaxial disks, wherein the two disks are spaced apart to form an inner space, and wherein the two outer faces of each disk comprise at least a portion of the outer surface of the first wheel, and wherein at least a portion of the first wheel is positioned in the first container and at least a portion of the first wheel is positioned proximate at least a portion of the second container such that upon rotation of the second wheel, the second wheel transfers coating from the first container to the second container; and
- a second wheel comprising at least two coaxial disks, wherein the two disks are spaced apart to form an inner space, and wherein the two outer faces of each disk comprise at least a portion of the outer surface of the second wheel, and wherein at least a portion of the second wheel is positioned in the first container and at least a portion of the second wheel is positioned proximate at least a portion of the second container such that upon rotation of the second wheel, the second wheel transfers coating from the first container to the second container.

73. The apparatus of claim 72, further comprising at least one additional wheel comprising at least two coaxial disks, wherein the two disks are spaced apart to form an inner space, and wherein the two outer faces of each disk comprise at least a portion of the outer surface of the at least one additional wheel.

74. The apparatus of claim 72, further comprising a conveyor to transport at least one food product beneath the second container.

75. The apparatus of claim 72, wherein the food product comprises a dough-based product.

76. The apparatus of claim 72, further comprising a water jacket that surrounds at least a portion of the first container.

77. The apparatus of claim 76, wherein the water jacket is adapted to maintain the temperature of a coating positioned in the first container.

78. The apparatus of claim 72, wherein the first container comprises a divider positioned to divide the first container into a first sub-container and a second sub-container, wherein at least a portion of the first wheel is positioned in the first sub-container and wherein at least a portion of the second wheel is positioned in the second sub-container.

79. The apparatus of claim 78, wherein the divider comprises a closable port adapted to allow mixing of the contents of each sub-container.

80. The apparatus of claim 72, wherein the second container comprises a panel to divide the second container into a first sub-trough and a second sub-trough, wherein at least a portion of the first wheel is positioned proximate at least part of the first sub-trough and wherein at least a portion of the second wheel is positioned proximate at least part of the second sub-trough.

81. The apparatus of claim 80, wherein the second container comprises a slot into which the panel is inserted.

82. The apparatus of claim 72, wherein the second container comprises an opening adapted to allow at least a portion of the coating to exit from the second container.

83. The apparatus of claim 72, wherein the coating comprises a sugar-based coating.

84. An apparatus for the preparation of food products comprising:
- a heating unit for warming a pre-cooked product; and
- the apparatus of claim 72.

* * * * *